(12) United States Patent
Coker et al.

(10) Patent No.: US 8,902,527 B1
(45) Date of Patent: Dec. 2, 2014

(54) SYSTEMS AND METHODS FOR IMPROVING SEQUENTIAL DATA RATE PERFORMANCE USING SORTED DATA ZONES

(71) Applicant: Western Digital Technologies, Inc., Irvine, CA (US)

(72) Inventors: Kenny T. Coker, Firestone, CO (US); Alan T. Meyer, Anaheim Hills, CA (US); Nicholas M. Warner, Livermore, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/194,243

(22) Filed: Feb. 28, 2014

Related U.S. Application Data

(63) Continuation of application No. 12/729,159, filed on Mar. 22, 2010, now Pat. No. 8,687,306.

(51) Int. Cl.
*G11B 5/596* (2006.01)
(52) U.S. Cl.
USPC .......................................................... 360/48
(58) Field of Classification Search
USPC .......................................................... 360/48
See application file for complete search history.

(56) References Cited

U.S. PATENT DOCUMENTS

| | | | |
|---|---|---|---|
| 4,769,770 A | 9/1988 | Miyadera et al. | |
| 4,992,936 A | 2/1991 | Katada et al. | |
| 5,121,480 A | 6/1992 | Bonke et al. | |
| 5,270,885 A | 12/1993 | Satoh et al. | |
| 5,293,282 A | 3/1994 | Squires et al. | |
| 5,613,066 A | 3/1997 | Matsushima et al. | |
| 5,819,298 A | 10/1998 | Wong et al. | |
| 5,983,309 A | 11/1999 | Atsatt et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |

(Continued)

FOREIGN PATENT DOCUMENTS

| | | |
|---|---|---|
| WO | 00/01146 | 1/2000 |
| WO | 2009/102425 | 8/2009 |

OTHER PUBLICATIONS

James N. Malina, U.S. Appl. No. 13/526,241, filed Jun. 18, 2012, 39 pages.

(Continued)

*Primary Examiner* — Mark Blouin

(57) ABSTRACT

Systems and methods for writing a sequence of data to a disk drive using sorted data zones are provided. One embodiment includes a disk drive comprising one or more disks having a plurality of disk surfaces, wherein each disk surface comprises a plurality of data zones, each data zone having a data transfer rate; a plurality of heads, wherein each head is configured to write data to a respective one of the disk surfaces; and a controller configured to operate the plurality of heads to sequentially write a sequence of data blocks to the plurality of disk surfaces in accordance with an order of head-zone combinations ordered from highest data transfer rate to lowest data transfer rate, each head-zone combination corresponding to one of the heads and one of the data zones of the respective disk surface.

22 Claims, 11 Drawing Sheets

(56) References Cited

U.S. PATENT DOCUMENTS

| | | |
|---|---|---|
| 6,092,231 A | 7/2000 | Sze |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,182,250 B1 | 1/2001 | Ng et al. |
| 6,191,909 B1 | 2/2001 | Cloke et al. |
| 6,195,218 B1 | 2/2001 | Guttmann et al. |
| 6,202,121 B1 | 3/2001 | Walsh et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,240,501 B1 | 5/2001 | Hagersten |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,324,604 B1 | 11/2001 | Don et al. |
| 6,327,106 B1 | 12/2001 | Rothberg |
| 6,337,778 B1 | 1/2002 | Gagne |
| 6,339,811 B1 | 1/2002 | Gaertner et al. |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,454 B1 | 6/2002 | Monroe, III |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,556,365 B2 | 4/2003 | Satoh |
| 6,574,774 B1 | 6/2003 | Vasiliev |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,636,049 B1 | 10/2003 | Lim et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,538 B1 | 2/2004 | Saito et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,728,054 B2 | 4/2004 | Chng et al. |
| 6,735,032 B2 | 5/2004 | Dunn et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,274 B1 | 8/2004 | Estakhri |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,829,688 B2 | 12/2004 | Grubbs et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,886,068 B2 | 4/2005 | Tomita |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,468 B2 | 5/2005 | Rege et al. |
| 6,895,500 B1 | 5/2005 | Rothberg |
| 6,898,730 B1 | 5/2005 | Hanan |
| 6,901,479 B2 | 5/2005 | Tomita |
| 6,910,099 B1 | 6/2005 | Wang et al. |
| 6,920,455 B1 | 7/2005 | Weschler |
| 6,928,470 B1 | 8/2005 | Hamlin |
| 6,931,439 B1 | 8/2005 | Hanmann et al. |

(56) References Cited

U.S. PATENT DOCUMENTS

| | | |
|---|---|---|
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,956,710 B2 | 10/2005 | Yun et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,967,810 B2 | 11/2005 | Kasiraj et al. |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,980,386 B2 | 12/2005 | Wach et al. |
| 6,983,316 B1 | 1/2006 | Milne et al. |
| 6,986,007 B1 | 1/2006 | Procyk et al. |
| 6,986,154 B1 | 1/2006 | Price et al. |
| 6,992,852 B1 | 1/2006 | Ying et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,012,771 B1 | 3/2006 | Asgari et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,035,961 B2 | 4/2006 | Edgar et al. |
| 7,046,465 B1 | 5/2006 | Kupferman |
| 7,046,471 B2 | 5/2006 | Meyer et al. |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,391 B1 | 7/2006 | Pakzad et al. |
| 7,076,604 B1 | 7/2006 | Thelin |
| 7,082,007 B2 | 7/2006 | Liu et al. |
| 7,082,494 B1 | 7/2006 | Thelin et al. |
| 7,088,538 B1 | 8/2006 | Codilian et al. |
| 7,088,545 B1 | 8/2006 | Singh et al. |
| 7,089,355 B2 | 8/2006 | Auerbach et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,113,358 B2 | 9/2006 | Zayas et al. |
| 7,114,029 B1 | 9/2006 | Thelin |
| 7,120,726 B2 | 10/2006 | Chen et al. |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,448 B2 | 12/2006 | Winter |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,199,981 B2 * | 4/2007 | Zabtcioglu ............. 360/266.2 |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,254,671 B2 | 8/2007 | Haswell |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,283,316 B2 | 10/2007 | Chiao et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,298,568 B2 * | 11/2007 | Ehrlich et al. ............... 360/53 |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,343,517 B2 | 3/2008 | Miller et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,408,731 B2 | 8/2008 | Uemura et al. |
| 7,412,585 B2 | 8/2008 | Uemura |
| 7,415,571 B1 | 8/2008 | Hanan |
| 7,436,610 B1 | 10/2008 | Thelin |
| 7,436,614 B2 | 10/2008 | Uchida |
| 7,437,502 B1 | 10/2008 | Coker |
| 7,440,214 B1 | 10/2008 | Ell et al. |
| 7,440,224 B2 * | 10/2008 | Ehrlich et al. ............. 360/77.08 |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,460 B2 | 2/2009 | Tsuchinaga et al. |
| 7,490,212 B2 | 2/2009 | Kasiraj et al. |
| 7,496,493 B1 | 2/2009 | Stevens |
| 7,509,471 B2 | 3/2009 | Gorobets |
| 7,516,267 B2 | 4/2009 | Coulson et al. |
| 7,518,819 B1 | 4/2009 | Yu et al. |
| 7,526,184 B1 | 4/2009 | Parkinen et al. |
| 7,529,880 B2 | 5/2009 | Chung et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,603,530 B1 | 10/2009 | Liikanen et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,669,044 B2 | 2/2010 | Fitzgerald et al. |
| 7,672,072 B1 | 3/2010 | Boyle et al. |

(56) References Cited

U.S. PATENT DOCUMENTS

| | | |
|---|---|---|
| 7,673,075 B1 | 3/2010 | Masiewicz |
| 7,685,360 B1 | 3/2010 | Brunnett et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,840,878 B1 | 11/2010 | Tang et al. |
| 7,843,660 B1 | 11/2010 | Yeo |
| 7,852,596 B2 | 12/2010 | Boyle et al. |
| 7,859,782 B1 | 12/2010 | Lee |
| 7,860,836 B1 | 12/2010 | Natanzon et al. |
| 7,872,822 B1 | 1/2011 | Rothberg |
| 7,885,921 B2 | 2/2011 | Mahar et al. |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,031,423 B1 | 10/2011 | Tsai et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,179,627 B2 | 5/2012 | Chang et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,341,339 B1 | 12/2012 | Boyle et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,443,167 B1 | 5/2013 | Fallone et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |

(56) References Cited

U.S. PATENT DOCUMENTS

| | | |
|---|---|---|
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 2001/0042166 A1 | 11/2001 | Wilson et al. |
| 2003/0065872 A1 | 4/2003 | Edgar et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2005/0069298 A1 | 3/2005 | Kasiraj et al. |
| 2005/0071537 A1 | 3/2005 | New et al. |
| 2005/0138265 A1 | 6/2005 | Nguyen et al. |
| 2005/0144517 A1 | 6/2005 | Zayas |
| 2005/0157416 A1 | 7/2005 | Ehrlich et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0113702 A1 | 5/2009 | Hogg |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0271581 A1 | 10/2009 | Hinrichs, Jr. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2010/0306551 A1 | 12/2010 | Meyer et al. |
| 2011/0167049 A1 | 7/2011 | Ron |
| 2011/0226729 A1 | 9/2011 | Hogg |
| 2011/0304935 A1 | 12/2011 | Chang et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Albert H. Chen, et. al., U.S. Appl. No. 13/784,494, filed Mar. 4, 2013, 37 pages.

Joe C. Lee, et. al., U.S. Appl. No. 13/928,156, filed Jun. 26, 2013, 21 pages.

William B. Boyle, U.S. Appl. No. 13/329,053, filed Dec. 16, 2011, 29 pages.

Rosenblum, Mendel and Ousterhout, John K. (Feb. 1992), "The Design and Implementation of a Log-Structured File System." ACM Transactions on Computer Systems, vol. 10, Issue 1, pp. 26-52.

Rosenblum, "The Design and Implementation of a Log-structured File System", EECS Department, University of California, Berkeley, Technical Report No. UCB/CSD-92-696, Jun. 1992.

Amer, et al., "Design Issues for a Shingled Write Disk System", 26th IEEE Symposium on Massive Storage Systems and Technologies: Research Track (MSST 2010), May 2010, 12 pages.

Definition of adjacent, Merriam-Webster Dictionary, retrieved from http://www.merriam-webster.com/dictionary/adjacent on Oct. 30, 2013 (1 page).

RE:Hard drive Inner or Outer tracks???, Matthias99, Apr. 12, 2004, retrieved from http://forums.anandtech.com/showthread.php?p=11055300 on Oct. 29, 2013.

You Don't Know Jack about Disks, Dave Anderson, Seagate Technologies, Queue—Storage Queue, vol. 1, issue 4, Jun. 2003, pp. 20-30 (11 pages).

Notice of Allowance dated May 24, 2013 from U.S. Appl. No. 12/729,159, 20 pages.

Notice of Allowance dated Aug. 21, 2013 from U.S. Appl. No. 12/729,159, 25 pages.

Notice of Allowance dated Nov. 25, 2013 from U.S. Appl. No. 12/729,159, 16 pages.

Notice of Allowance dated May 20, 2013 from U.S. Appl. No. 13/766,470, 14 pages.

Notice of Allowance dated Aug. 20, 2013 from U.S. Appl. No. 13/766,470, 25 pages.

Notice of Allowance dated Nov. 29, 2013 from U.S. Appl. No. 13/766,470, 16 pages.

* cited by examiner

|  | Head | | | |
|---|---|---|---|---|
|  | 1 | 2 | 3 | 4 |
| Zone | | | | |
| 1 | 1000 | 800 | 1000 | 1000 |
| 2 | 980 | 784 | 980 | 980 |
| 3 | 960 | 768 | 960 | 960 |
| 4 | 940 | 752 | 940 | 940 |
| 5 | 920 | 736 | 920 | 920 |
| 6 | 900 | 720 | 900 | 900 |
| 7 | 880 | 704 | 880 | 880 |
| 8 | 860 | 688 | 860 | 860 |
| 9 | 840 | 672 | 840 | 840 |
| 10 | 820 | 656 | 820 | 820 |
| 11 | 800 | 640 | 800 | 800 |
| 12 | 780 | 624 | 780 | 780 |
| 13 | 760 | 608 | 760 | 760 |
| 14 | 740 | 592 | 740 | 740 |
| 15 | 720 | 576 | 720 | 720 |
| 16 | 700 | 560 | 700 | 700 |
| 17 | 680 | 544 | 680 | 680 |
| 18 | 660 | 528 | 660 | 660 |
| 19 | 640 | 512 | 640 | 640 |
| 20 | 620 | 496 | 620 | 620 |

| Head | Zone |
|---|---|
| 1 | 1 |
| 3 | 1 |
| 4 | 1 |
| 1 | 2 |
| 3 | 2 |
| 4 | 2 |
| 1 | 3 |
| 3 | 3 |
| 4 | 3 |
| 1 | 4 |
| 3 | 4 |

| Head | Zone |
|---|---|
| 1 | 9 |
| 3 | 9 |
| 4 | 9 |
| 1 | 10 |
| 3 | 10 |
| 4 | 10 |
| 1 | 11 |
| 2 | 1 |
| 3 | 11 |
| 4 | 11 |
| 2 | 2 |
| 1 | 12 |
| 3 | 12 |
| 4 | 12 |
| 2 | 3 |
| 1 | 13 |

SYSTEMS AND METHODS FOR IMPROVING SEQUENTIAL DATA RATE PERFORMANCE USING SORTED DATA ZONES

CROSS REFERENCE TO RELATED APPLICATION(S)

This application is a continuation of co-pending application Ser. No. 12/729,159 filed on Mar. 22, 2010, which is hereby incorporated by reference.

BACKGROUND OF THE INVENTION

A multi-head disk drive may include multiple heads and disk surfaces, where each head is configured to write data to and read data from a respective one of the disk surfaces. Each disk surface may be formatted into a number of data zones, where each data zone is associated with a particular data transfer rate. The format may vary from disk surface to disk surface within a disk drive. This may be due to differences in performance of their respective heads and/or other factor. When a sequence of data is written to the disk drive, format variations among the disk surfaces in the disk drive may result in undesirable large fluctuations in the sequential data rate of the disk drive.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 5 is table shown an example of zones and data rates for an example of a four-head disk drive;

FIG. 8 is an example of an ordered list of head-zone combinations ordered from highest data rate to lowest data rate;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
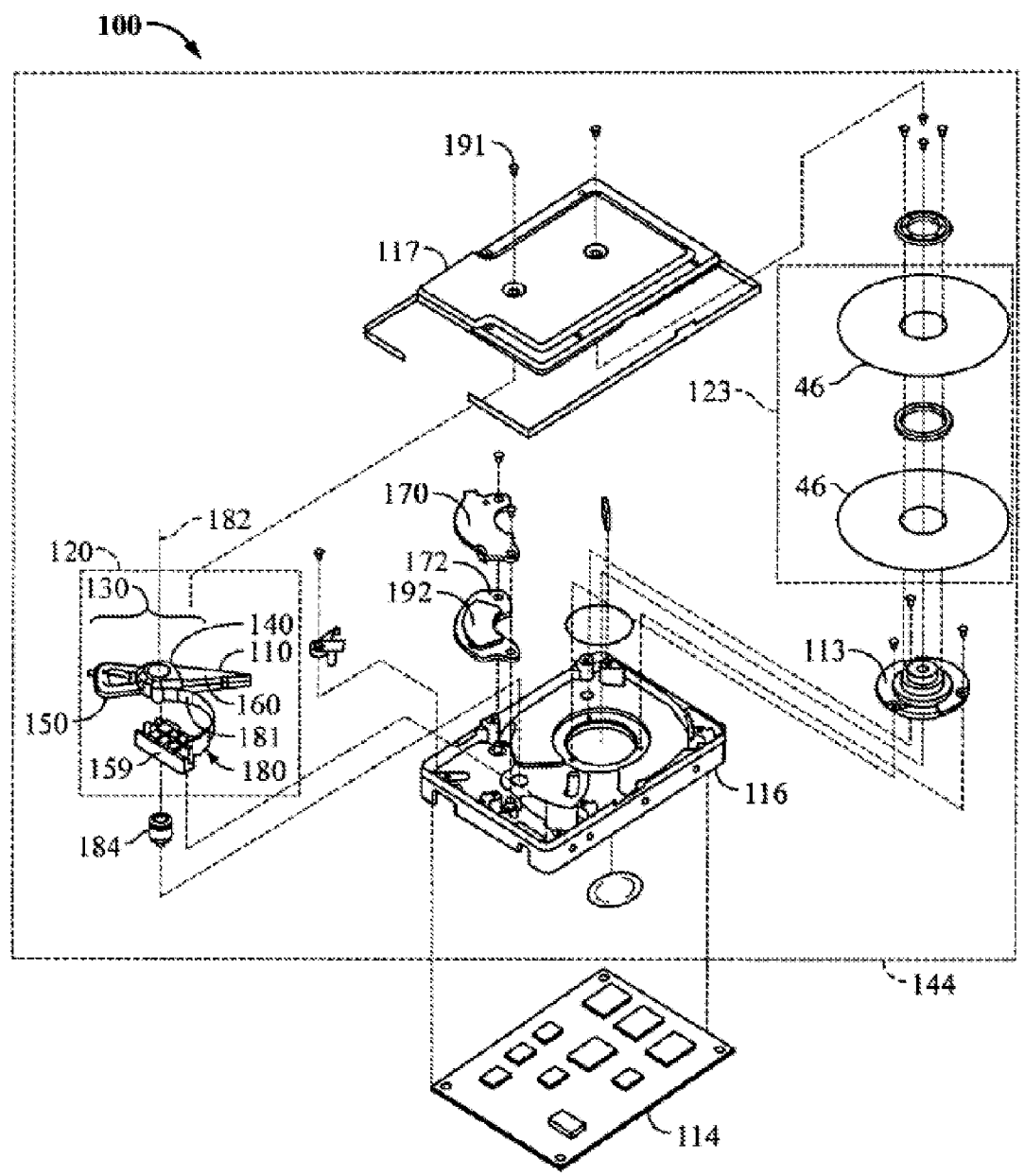
FIG. 1 is a perspective, exploded view of an example of a disk drive.

FIG. 1 is a perspective view illustrating the principal mechanical components of a disk drive 100 that may be utilized with embodiments of the invention. The disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks 46, a spindle motor 113 attached to the base 116 for rotating the disk stack 123, a head stack assembly (HSA) 120, and a pivot bearing cartridge 184 that rotatably supports the HSA 120 on the base 116. The spindle motor 113 may rotate the disk stack 123 at a relatively constant angular velocity.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a VCM coil 150 cantilevered from the body portion 140 in an opposite direction from the actuator arm 160. The actuator arm 160 supports the HGA 110 that, in turn, supports a read/write head. The flex cable assembly 180 may include a flex circuit cable and a flex clamp 159. The storage capacity of the HDA 144 may be increased by, for example, including additional disks 46 in the disk stack 123 and by the HSA 120 having a vertical stack of HGAs 110 and heads supported by multiple actuator arms 160.

The HSA 120 is pivotally secured to the base 116 via the pivot-bearing cartridge 184 so that the heads at the distal end of the HGAs 110 may be moved over the surfaces of the disks 46. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 46.

The "rotary" or "swing-type" actuator assembly comprises body portion 140 that rotates on the pivot bearing 184 cartridge between limited positions, VCM coil 150 that extends from body portion 140 to interact with one or more permanent magnets 192 mounted to back irons 170, 172 to form the voice coil motor (VCM), and actuator arm 160 that supports HGA 110. The VCM causes the HSA 120 to pivot about the actuator pivot axis 182 to cause the heads thereof to sweep radially over the disks 46.

Figure 2:
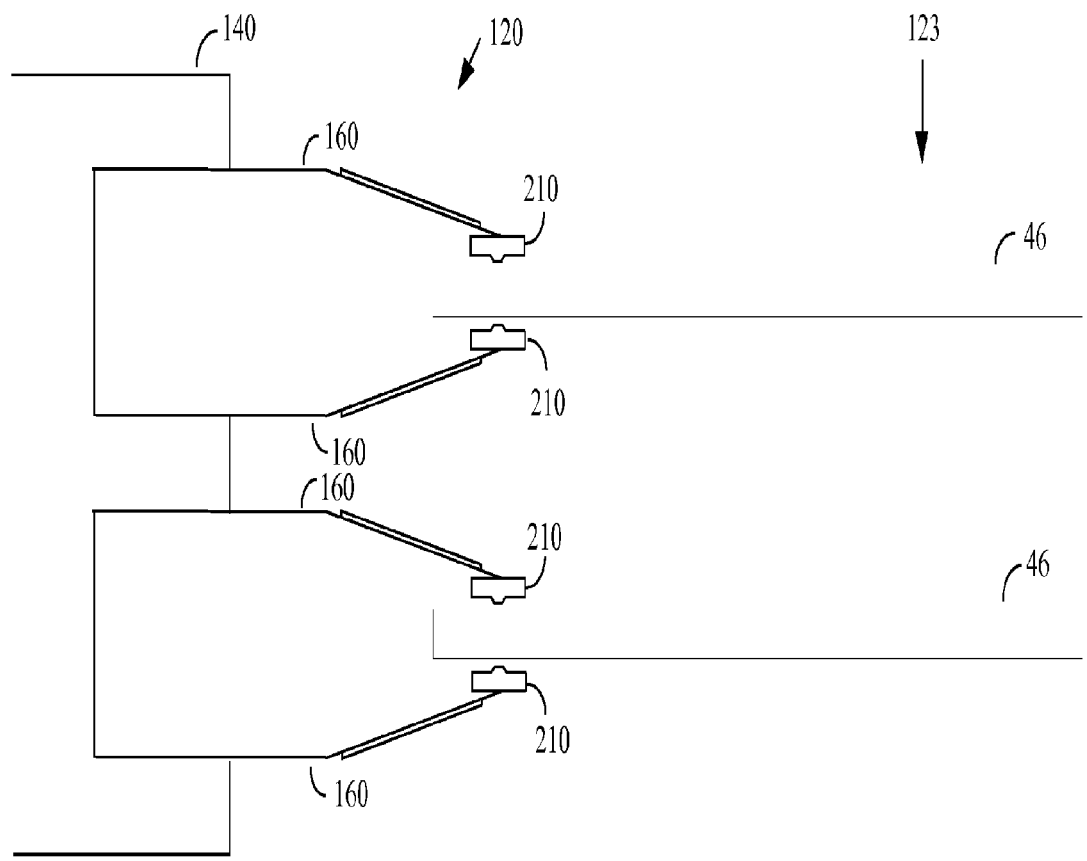
FIG. 2 is a diagram showing a side view of a head stack assembly and a disk stack for an example of a four-head disk drive.

FIG. 2 is a diagram showing a side view of the HSA 120 and the disk stack 123 for an example of a four-head disk drive 100. In this example, the HSA 120 comprises four read/write heads 210 and the disk stack 123 comprises two magnetic disks 46, where each head 210 is configured to magnetically write data to and read data from a respective surface of one of the disks 46. The HSA also comprises actuator arms 160, where each actuator arm 160 is configured to move the respective head 210 radially across the respective disk surface to position the head 210 at a desired track. The actuator arms 160 are attached to the body portion 140 of the HSA 120, which pivots about the pivot axis 182 (shown in FIG. 1). By pivoting the HSA 120, the VCM is able to move the heads 210 radially across the respective disk surfaces. Although four heads 210 are shown in FIG. 2, those skilled in the art will appreciated that the multi-head disk drive may include any number of heads.

Figure 3:
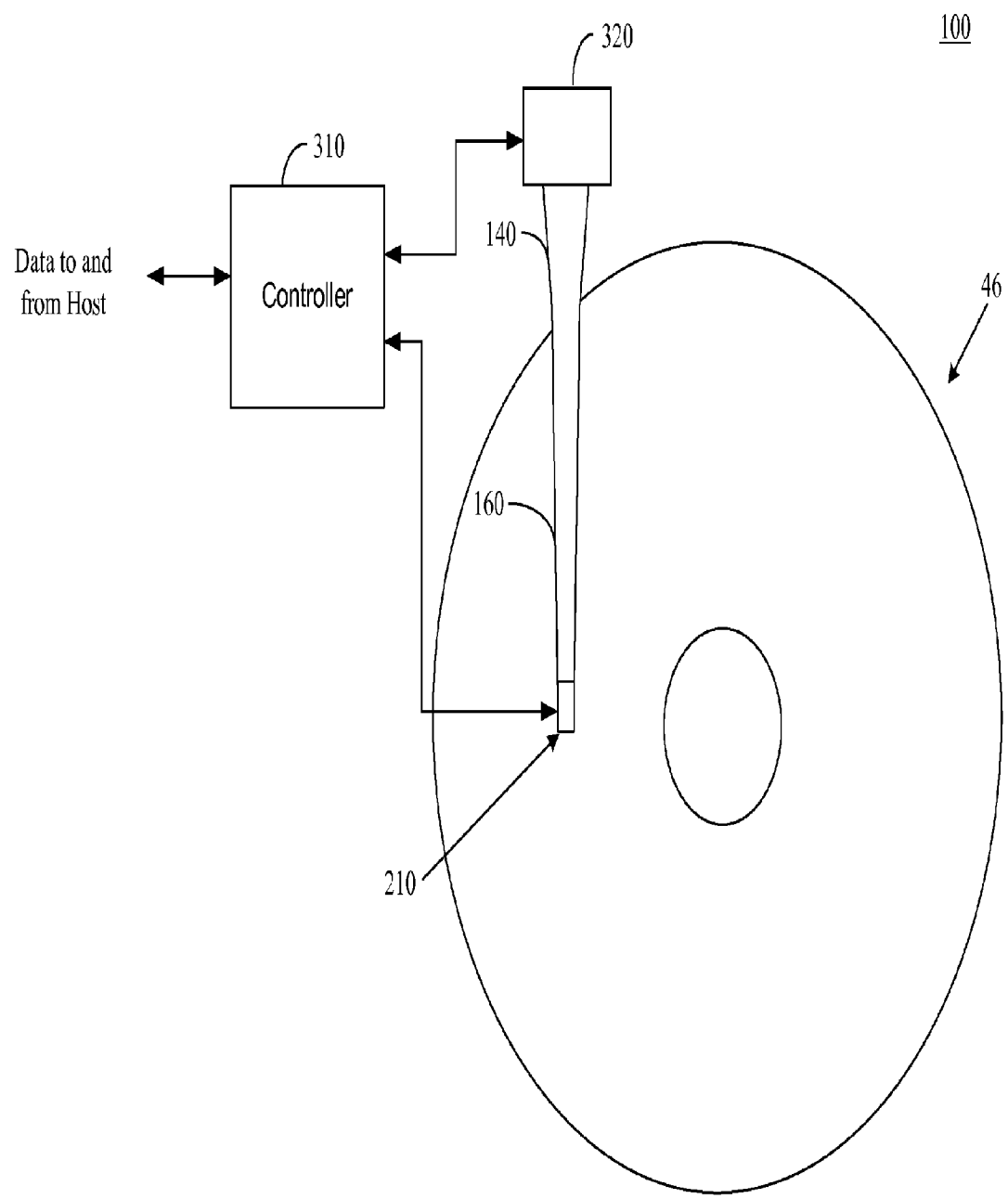
FIG. 3 is a diagram showing a disk drive.

FIG. 3 is a diagram showing the disk drive 100 according to an embodiment of the present invention. The disk drive 100 includes a controller 310 that performs various operations of the disk drive 100 described herein. The controller 310 may be located on the PCBA 114 shown in FIG. 1. The controller 310 may be implemented using one or more processors for executing instructions and may further include memory, such as a volatile or non-volatile memory, for storing data (e.g., data being processed and/or buffered), instructions, address tables, etc. The instructions may be executed by the one or more processors to perform the various functions of the controller 310 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

In one embodiment, the controller 310 transfers data between a host (not shown) and the disks 46 based on commands from the host. For example, the controller 310 may receive a write command including data to be written to the disk drive 100 from the host. The data may be logically divided into data blocks that are addressed by the host using logical block addresses (LBAs). In this example, the controller 310 may write the data to one or more disks 46 via the respective heads 210, and maintain an address table mapping the LBAs of the data blocks from the host with physical addresses of the data blocks on the disks 46. The controller 310 may also position the heads 210 at desired tracks on the disk 46 during write and/or read operations using the VCM 320.

Figure 4A:
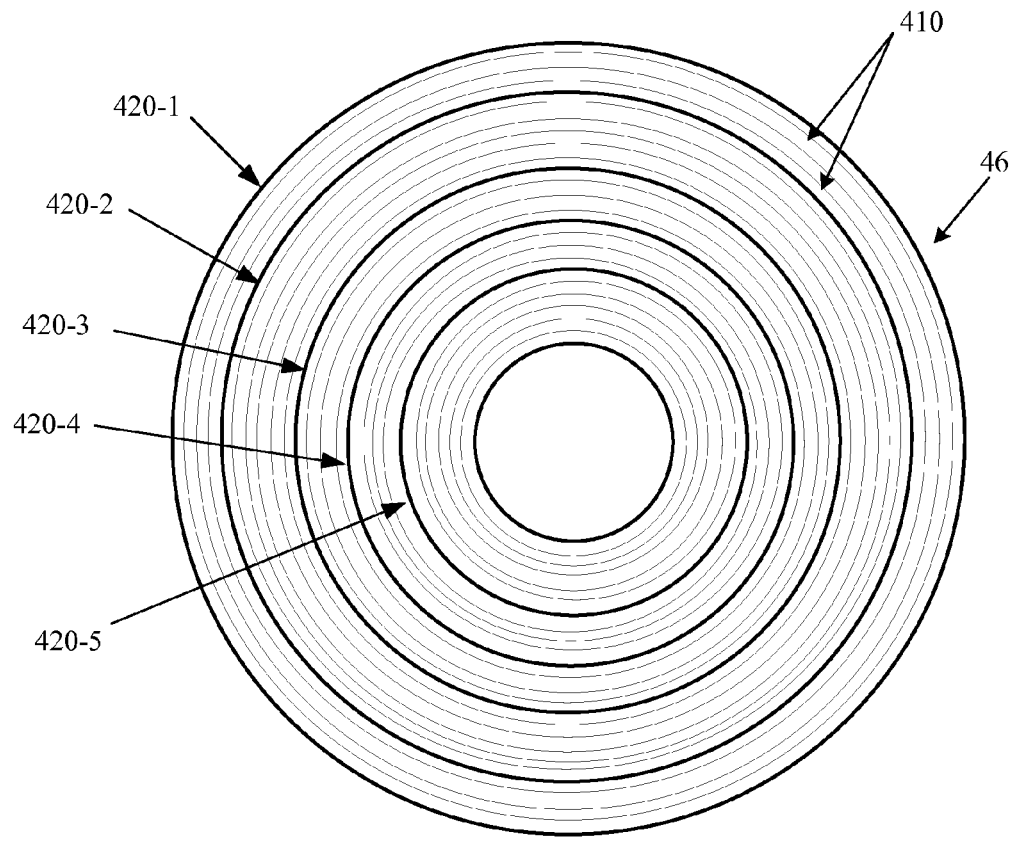
FIG. 4A shows an example of a disk surface partitioned into data zones.

Each surface of a disk 46 may be partitioned into data zones for storing data, an example of which is shown in FIG. 4A. In this example, the disk surface comprises a plurality of concentric data tracks 410, and each data zone may comprise a range the data tracks 140 on the disk surface. Each zone may be bounded by servo cylinders and/or data tracks defining an outer circumference and inner circumference of the zone.

Each data track 410 may further comprises a number of data sectors (not shown). Data tracks 140 within a particular data zone may have a similar number of sectors per track and a different number of sectors per track than tracks 140 within the other data zones. The number of sectors per track for each zone 420-1 to 420-5 may decrease moving from the outermost zone 420-1 to the innermost zone 420-5 with the outermost zone 420-1 having the largest number of sectors per track and the innermost zone 420-5 having the smallest number of sectors per tracks.

When the disk 46 is rotated at a relatively constant angular velocity, the larger number of sectors per track of the outermost zone 420-1 translates into a higher data transfer rate or data frequency than the innermost zone 420-5. In this example, the data transfer rate for each zone 420-1 to 420-5 decreases moving from the outermost zone 420-1 to the innermost zone 420-5 with the outermost zone 420-1 having the highest data rate and the innermost zone 420-5 having the lowest data rate. FIG. 4A shows an example in which the disk surface is partitioned into five data zones. Although five data zones are shown in this example for ease of illustration, those skilled in the art will appreciate that the disk surface may be partitioned into any number of data zones. Also, the number of tracks within each zone may be constant or may vary from zone to zone as shown in the example in FIG. 4A with some zones having more tracks than others.

Figure 4B:
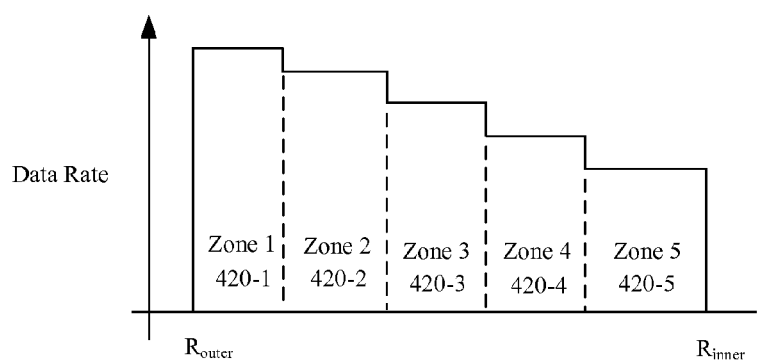
FIG. 4b is a plot showing an example of data rates for the different data zones shown in FIG. 4A.

FIG. 4B is a plot showing an example of data transfer rates for the different data zones 420-1 to 420-5 shown in FIG. 4A. In this example, the data transfer rate decreases in a stepwise manner moving from the outermost zone 420-1 to the innermost zone 420-5. The plot also shows the radial positions of the zones 420-1 to 420-5 on the disk surface relative to an outer radius and inner radius of the disk. In this example, the zones 420-1 to 420-5 may be indexed by zone numbers 1-5 with zone 1 corresponding to the outermost zone 420-1 and zone 5 corresponding to the innermost zone 420-5.

As discussed above, a multi-head disk drive 100 may include a head 210 for each disk surface. Each disk surface may be partitioned into a plurality of data zones, where the each data zone may have a different data transfer rate than the other data zones of the respective disk surface. In one embodiment, the data zones of a particular disk surface may have data rates within a certain data rate range with the outermost zone of the disk surface having the highest data rate within the data rate range and the innermost data zone of the disk surface having the lowest data rate within the data rate range.

Different disk surfaces in a disk drive may have different ranges of data rates for their zones. This may be due to different levels of performance of the respective heads 210. For example, a higher performing head 210 may be able to write bits that are more tightly spaced together than a lower performing head 210. In this example, the disk surface corresponding to the higher performing head 210 may be formatted with zones have higher data rates than respective zones of the disk surface corresponding to the lower performing head 210. The different performances of the heads 210 may be due to variations in manufacturing of the heads 210 or other cause.

FIG. 5 is a table showing an example of data rates for four disk surfaces and their respective heads in a multi-head disk drive. Each column in the table corresponds to a particular disk surface and respective head, and each row corresponds to a particular data zone. In this example, each disk surface has 20 data zones, in which zone 1 corresponds to the outermost zone and zone 20 corresponds to the innermost zone of the disk surface. However, one skilled in the art will appreciate that the disk surfaces may have any number of data zones. Further, one skilled in the art will appreciate that one disk surface may have a different number of data zones than another disk surface. In this example, the disk surfaces corresponding to heads 1, 3 and 4 each have a data rate range of 1000 to 620 Mbits per second for their data zones while the disk surface corresponding to head 2 has a lower data rate range of 800 to 496 Mbits per second for its data zones. This may be due to lower performance of head 2 relative to the other heads 1, 3 and 4. In this example, the zones and data rates for each disk surface may be determined empirically, for example, based on performance measurements of the respective heads.

Figure 6:
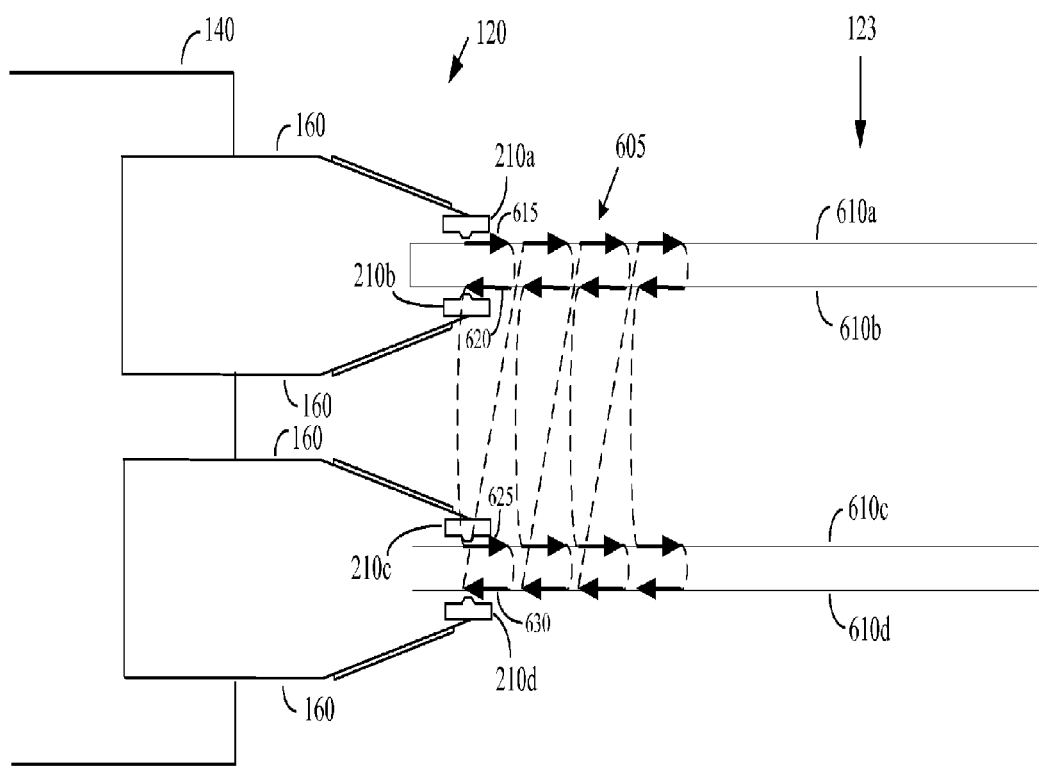
FIG. 6 shows an example of an access path having a "serpentine pattern" for a writing sequence of data to a disk drive.

A method for writing a sequence of data from the host to a multi-head disk drive will now be described with reference to FIGS. 5 and 6. In this method, the controller 310 may write a sequence of data to the disk surfaces of the disk drive by writing data to zone 1 across of all of the disk surfaces, then writing data to zone 2 across of all of the disk surfaces and so forth, an example of which is illustrated in FIG. 6. FIG. 6 shows an access path 605 along which a sequence of data may be written to the tracks of the disk surfaces 610a to 610d of the disk drive. Although the example shown in FIG. 6 has four heads, one skilled in the art will appreciate that the multi-head disk drive may include any number of heads.

In this example, the controller 310 may first write data to the tracks of zone 1 of disk surface 610a from left to right using head 210a, as indicated by arrow 615. After writing data to zone 1 of disk surface 610a, the controller 310 may switch heads to head 210b and write data to the tracks of zone 1 of disk surface 610b from right to left using head 210b, as indicated by arrow 620. After writing data to zone 1 of disk surface 610*b*, the controller 310 may switch heads to head 210*c* and write data to the tracks of zone 1 of disk surface 610*c* from left to right using head 210*c*, as indicated by arrow 625. After writing data to zone 1 of disk surface 610*c*, the controller 310 may switch heads to head 210*d* and write data to the tracks of zone 1 of disk surface 610*d* from right to left using head 210*d*, as indicated by arrow 630. After writing data to zone 1 of disk surface 610*d*, the controller 310 may switch heads to head 210*a* and begin writing data to zone 2 of the disk surfaces 610*a* to 610*d* in a similar manner as discussed above for zone 1. Head switches in the access path 605 are indicated by dashed lines in FIG. 6. Thus, the controller 310 writes to zone 1 across all heads 210*a*-210*d*, then to zone 2 across all heads 210*a*-210*d*, and so forth. The above process of sequentially writing a sequence of data to the disk surfaces 610*a* to 610*b* results in the access path 605 having the pattern shown in FIG. 6, which may be referred to as a "serpentine" pattern. Although FIG. 6 shows the access path 605 for the first four zones, those skilled in the art will appreciate that the access path 605 may continue for additional zones.

Figure 7:
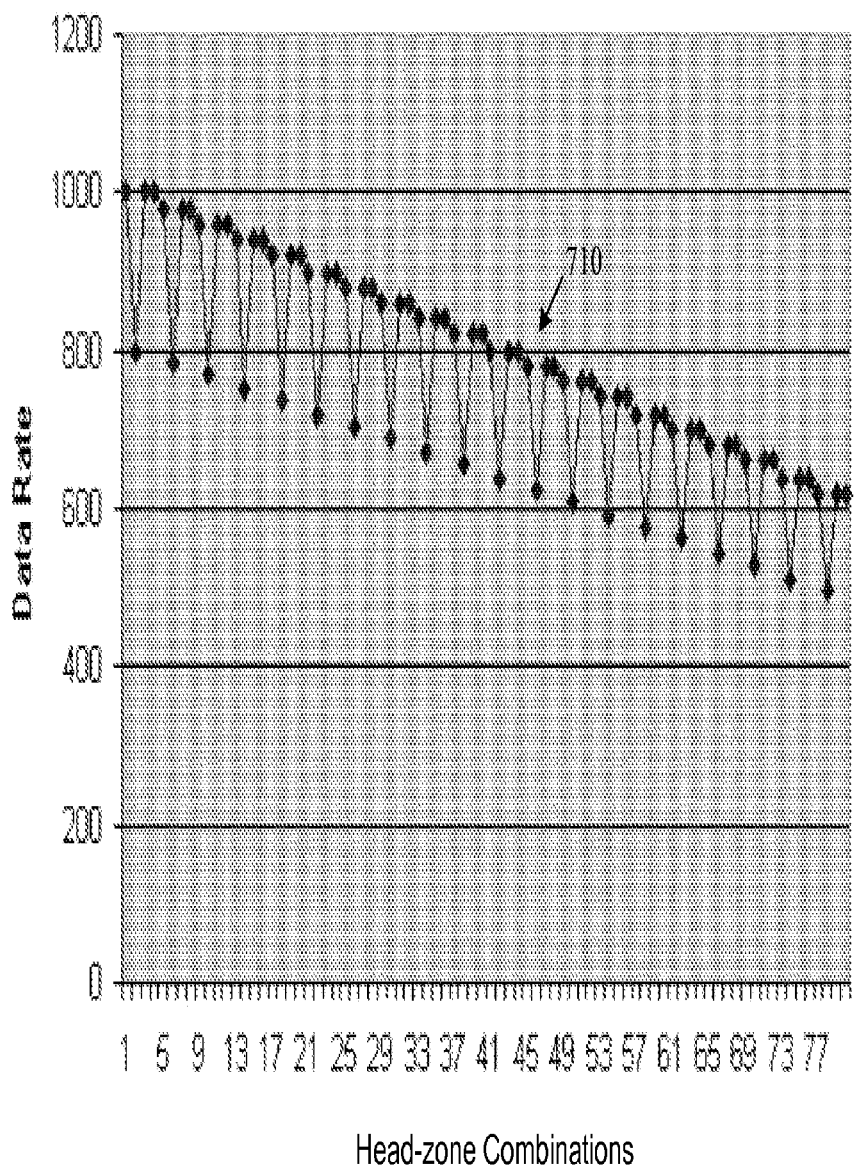
FIG. 7 is a plot showing an example of a data rate curve in accordance with the access path in FIG. 6.

FIG. 7 shows a plot of the data transfer rate for a sequence of data written to the disk drive in accordance with the access path 605 shown in FIG. 6 and the data rates shown in the example in FIG. 5. The sequence of data may comprise a sequence of data blocks logically addressed by a sequence of LBAs, where the LBAs increase from left to right in FIG. 7. In FIG. 7, data rate is plotted on the vertical axis in Mbits per second and head-zone combinations are plotted on the horizontal axis, where head-zone combinations 1-4 correspond to zone 1 across heads 1-4, head-zone combinations 5-8 correspond to zone 2 across heads 1-4, and so forth.

As shown in FIG. 7, each time data is written to the disk surface corresponding to head 2 (head 210*b* in FIG. 6), the sequential data rate drops sharply then rises sharply back up resulting in a data rate curve 710 characterized by downward spikes. This is because the zones of head 2 have lower data rates compared with the respective zones of heads 1, 3 and 4. As a result, the data rate curve 710 exhibits undesirable large fluctuations in data rate performance. In addition, the data rate curve 710 can vary from drive to drive, for example, depending on the relative performances of the heads of each drive.

A method for sorting data zones according to an embodiment of the present invention will now be described with reference to FIGS. 5 and 8. In one embodiment, it may be assumed that each disk surface of a disk drive has been formatted into a plurality of data zones with a data rate assigned to each zone. As discussed above, the zones and data rates for each disk surface may be determined empirically based on performance measurements of the respective head or other method. For example, there may be a predetermined set of disk surface formats, where each disk surface format specifies a number of zones, and the physical boundaries and data rate for each zone. In this example, one of the disk surface formats may be selected for a particular disk surface of a disk drive based, for example, on performance measurements of the respective head.

The zones of each disk surface may be paired with the respective head to form head-zone combinations. Each head-zone combination corresponds to one of the heads of the disk drive and a zone of the respective disk surface. For purposes of discussion, each head-zone combination may be designated by (head number, zone number).

In an embodiment, the controller 310 determines the data rate for each head-zone combination in the disk drive. For example, in the example shown in FIG. 5, there are 80 head-zone combinations.

The controller 310 may then order the head-zone combinations from the head-combination with the highest data rate to the head-zone combination with the lowest data rate.

Figure 8:
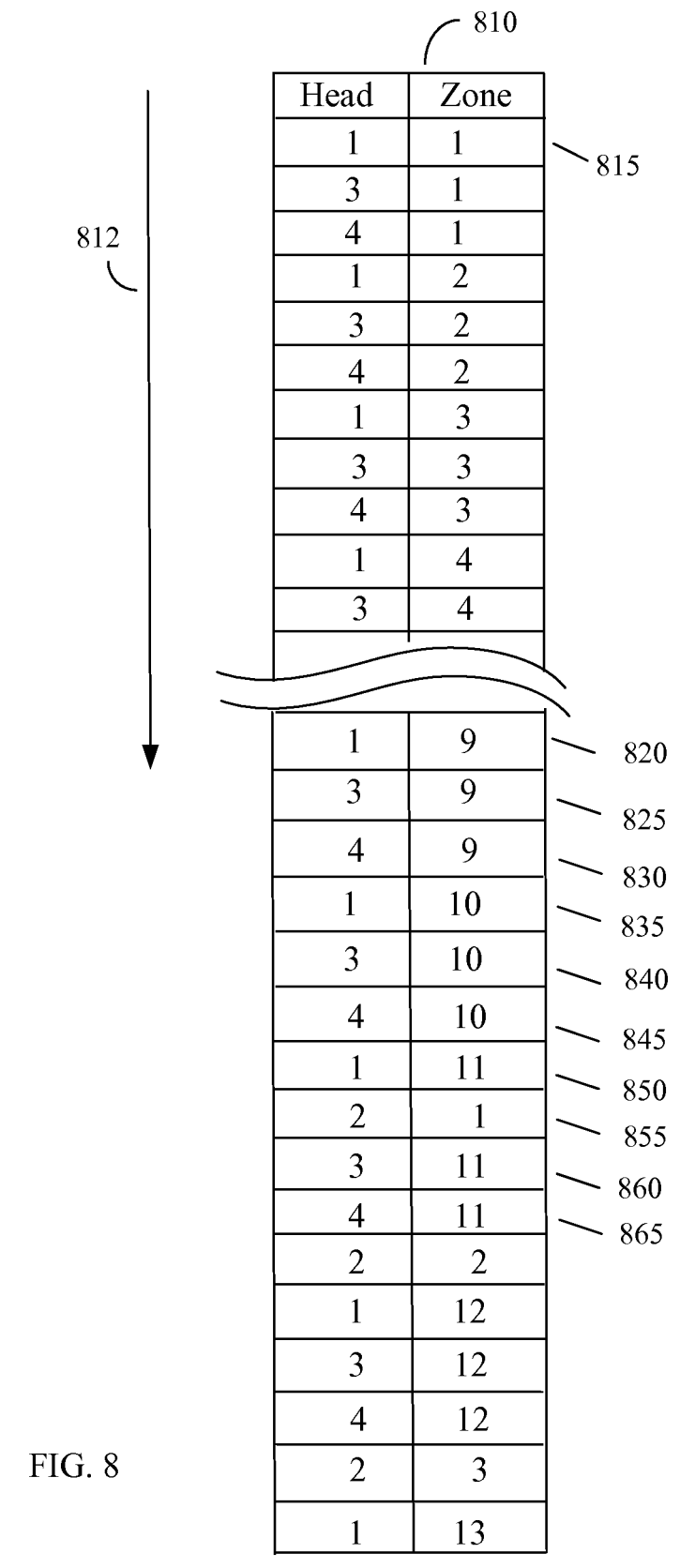

FIG. 8 shows an example of an ordered list 810, in which the head-zone combinations in FIG. 5 are ordered from highest data rate to lowest data rate. For head-zone combinations with the same data rate, the controller 310 may order these head-zone combinations consecutively based on a predetermined order of the heads or other method. In the example in FIG. 8, head-zone combinations (1, 1), (3, 1) and (4, 1), which have the same data rate of 1000 Mbits per second, may be ordered consecutively from head 1 to head 4. The ordered list 810 may be stored on one or more disks 46 and/or memory (e.g., DRAM, Flash, etc.) in the controller 310. Once stored in the drive, the ordered list 810 may be used to write a sequence of data to the disks 46, as discussed further below.

As a result of ordering the head-zone combinations from highest data rate to lowest data rate, the zones for lower performing head 2 in this example are sorted down the list 810. As shown in the example in FIG. 8, the head-zone combination (2, 1) for zone 1 of head 2 is sorted down the list 810 to entry 855 with the head-zone combinations (1, 11), (3, 11) and (4, 11) for zone 11 of heads 1, 3 and 4. This is because the data rate for head-zone combination (2, 1) is equivalent to the data rate for head-zone combinations (1, 11), (3, 11) and (4, 11) in this example. Thus, the data zone sorting according to embodiments of the present invention take into account the relative performance of each head in the disk drive by sorting the zones of lower performing heads down the ordered list.

A method for writing a sequence of data to a multi-head disk drive based on sorted zones will now be described with reference to FIGS. 9, 10A and 10B. The method may be performed by the controller 310. In one embodiment, the controller 310 may write a sequence of data to the disks 46 of the disk drive in accordance with an ordered list of head-zone combinations ordered from highest data rate to lowest data rate. For example, the controller 310 may sequentially progress through the ordered list of head-zone combinations in descending order, where, for each head-zone combination, the controller 310 may write a portion of the sequence of data to the corresponding data zone using the corresponding head.

For the example in FIG. 8, the controller 310 may write a sequence of data to the disks 46 by sequentially progressing through the ordered list 810 in descending order. In this example, the controller 310 may start with head-zone combination (1, 1) in the list 810 and write a portion of the sequence of data to zone 1 of head 1. After writing to zone 1 of head 1, the controller 310 may move down the list 810 to head-zone combination (3, 1) and write a next portion of the sequence of data to zone 1 of head 3. After writing to zone 1 of head 3, the controller 310 may move down the list 810 to head-zone combination (4, 1) and write a next portion of the sequence of data to zone 1 of head 4. After writing to zone 1 of head 4, the controller 310 may move down the list to head-zone combination (1, 2), which corresponds to the next-highest data rate in the drive. The controller 310 may continue down the list 810 to write subsequent portions of the sequence of data to the disks 46. The arrow 812 in FIG. 8 indicates the descending order in which the head-zone combinations in the ordered list 810 are sequentially accessed to write the sequence of data.

In one embodiment, the sequence of data may comprise a sequence of data blocks that are locally addressed by a sequence of LBAs. The sequence of LBAs may start at LBA 0 or other LBA number, where the LBA number is incremented for each data block in the sequence of data. As data is written to the disks 46, the controller 310 may update an address table mapping the LBAs of the data blocks to physical addresses (e.g., physical block addresses) of the data blocks on the disks 46. It is to be appreciated that other addressing schemes may be used for the sequence of data. For example, the sequence of data may comprise a sequence of data blocks that are dynamically assigned logical addresses instead of a sequence of logical addresses.

Figure 9:
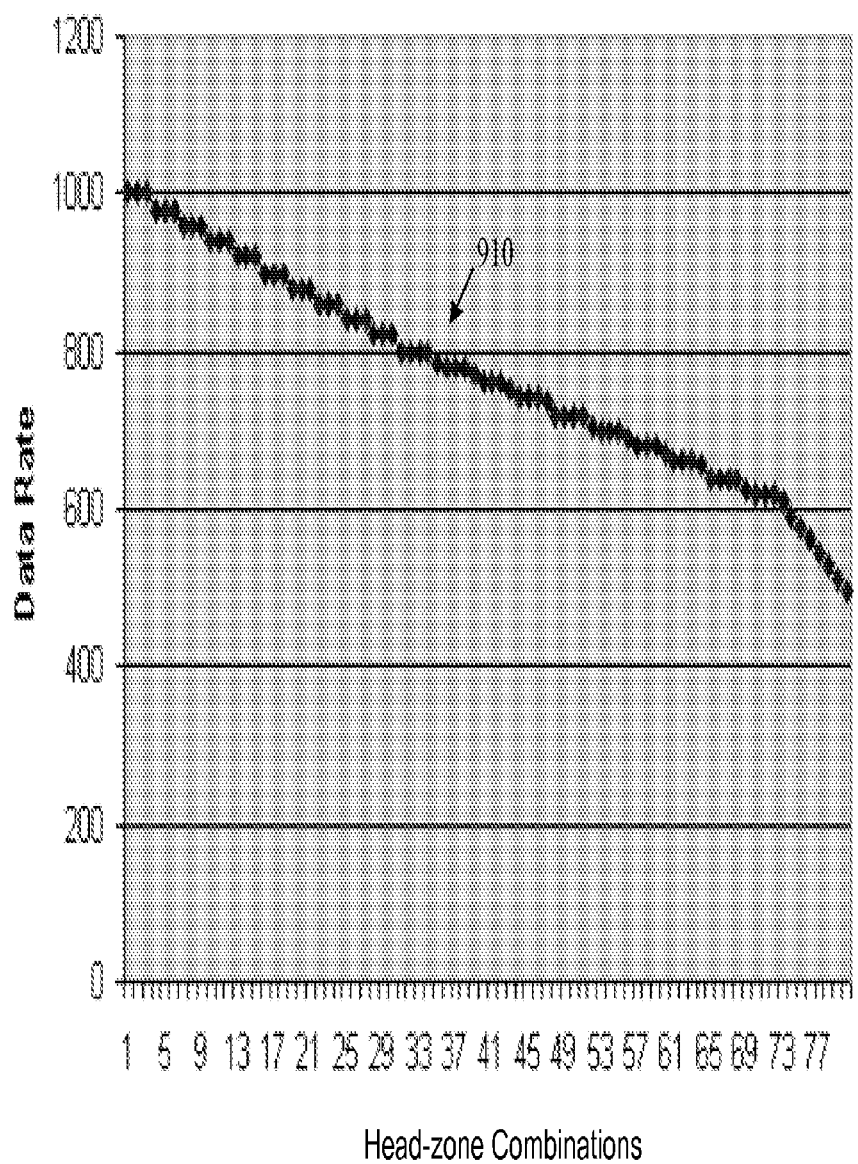
FIG. 9 is a plot showing an example of a data rate curve obtained by sequentially progressing through the ordered list in FIG. 8 in descending order.

FIG. 9 shows a plot of the data transfer rate for a sequence of data written to the disk drive by progressing down the ordered list 810 in FIG. 8. The sequence of data may comprise a sequence of data blocks corresponding to a sequence of LBAs that increase from left to right in FIG. 9. In FIG. 9, data rate is plotted on the vertical axis in Mbits per second and head-zone combinations are plotted on the horizontal axis. The head-zone combinations along the horizontal axis are ordered in accordance with the ordered list 810, with head-zone combination 1 in FIG. 9 corresponding to the top of the ordered list 810.

As shown in FIG. 9, the sequential data transfer rate monotonically decreases resulting in a smooth data rate curve 910 compared with the data rate curve 710 in FIG. 7. This is because the head-zone combinations associated with lower performing head 2 are sorted down the ordered list 810. As a result, head 2 is not used until the sequential data rate decreases to the highest data rate associated with head 2. The data zone sorting according to embodiments of the invention ensures that the sequential data rate for a sequence of data written to a drive consistently moves from high data rate to low data rate.

Figure 10A:
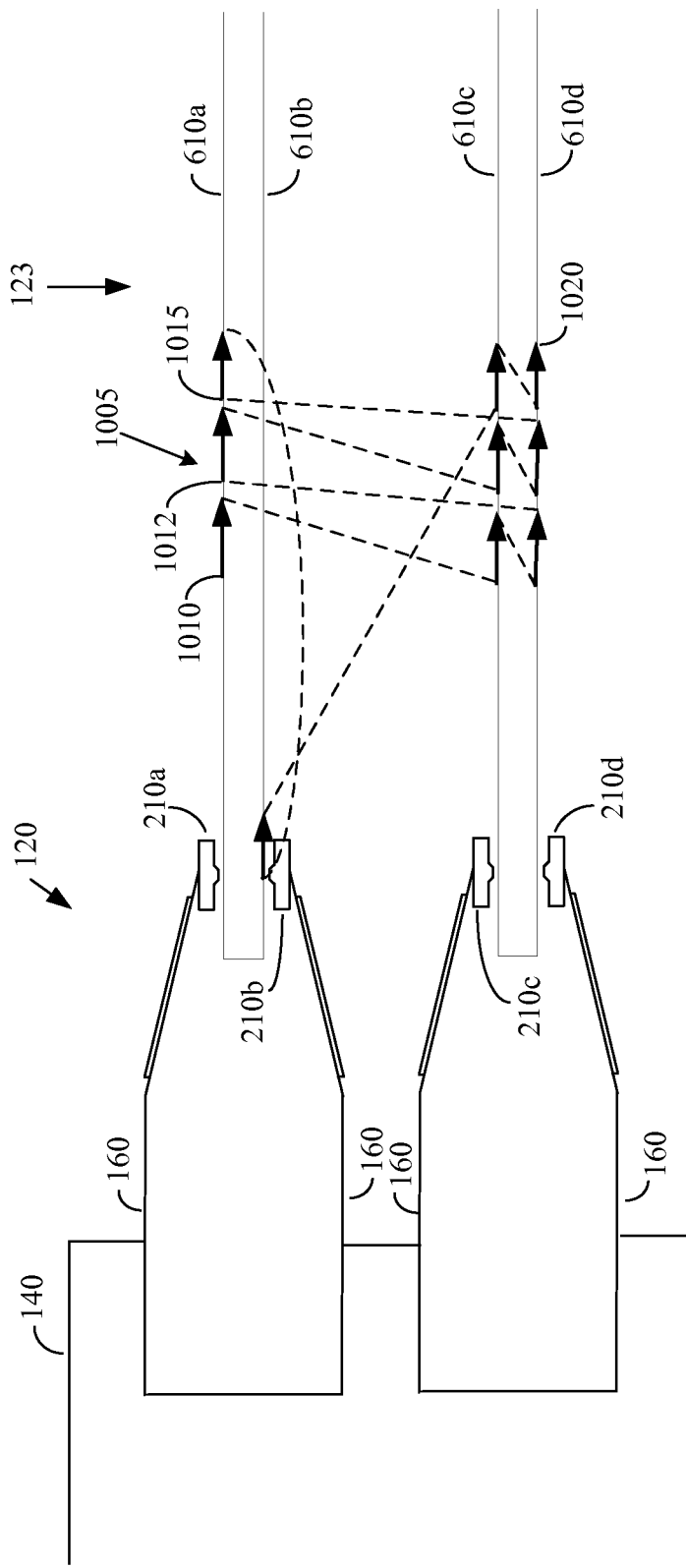
FIG. 10A shows an example of an access path for writing a sequence of data to a disk drive in accordance with the ordered list in FIG. 8.
Figure 10B:
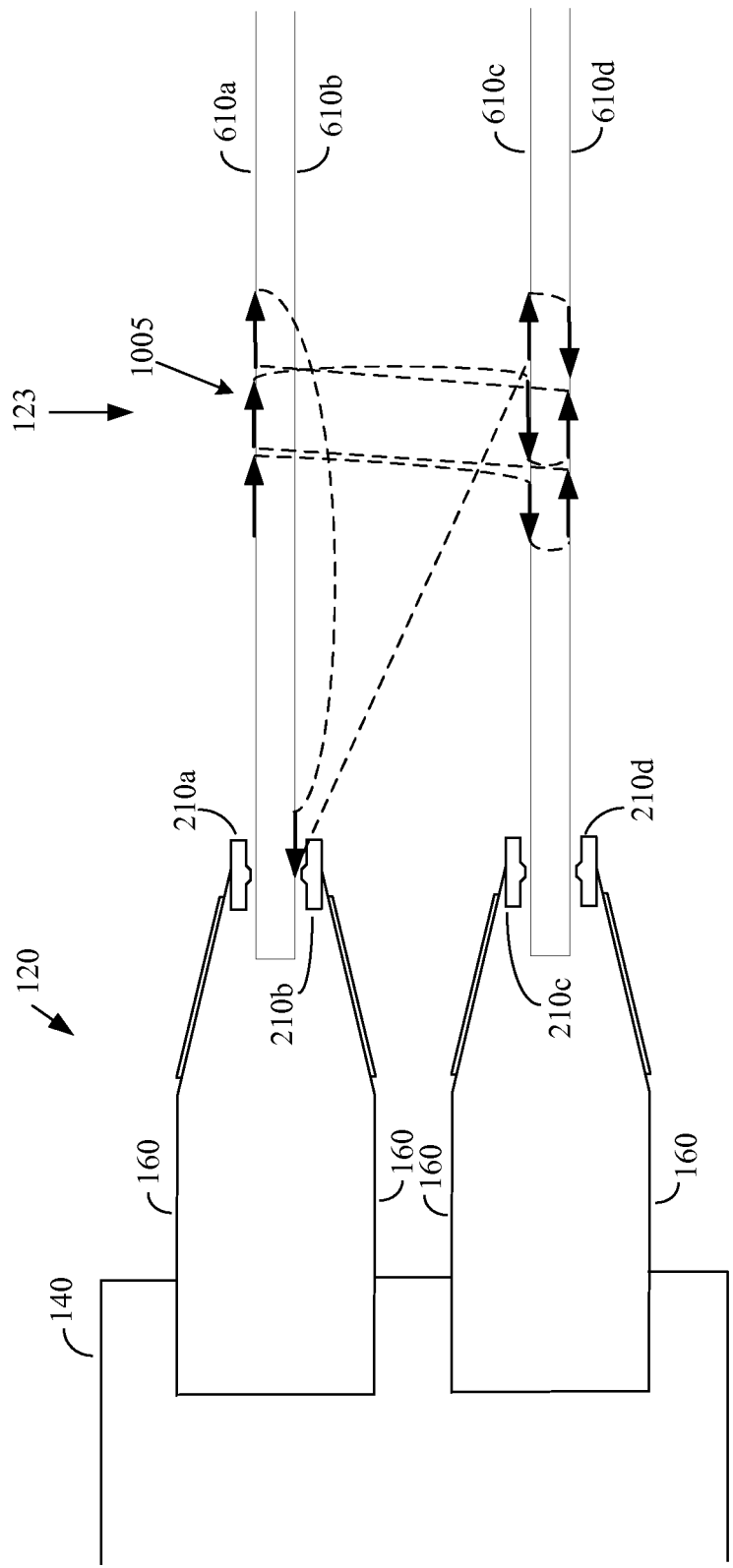
FIG. 10B shows another example of an access path for writing a sequence of data to a disk drive in accordance with the ordered list in FIG. 8.

FIG. 10A illustrates an example of an access path 1005 along which a sequence of data may be written to the tracks of the disk surfaces 610*a* to 610*d* of the disk drive. In this example, the access path 1005 is defined by sequentially progressing through the head-zone combinations in the ordered list 810 in descending order. FIG. 10A shows a portion of the access path 1005 corresponding to the head-zone combinations in entries 820 through 865 of the ordered list 810 in FIG. 8. The portion of the access path 1005 shown in FIG. 10A starts a point 1010 and ends at point 1020. In this example, heads 210*a*-210*d* in FIG. 10 correspond to heads 1-4 in the ordered list 810, respectively. In the discussion below, the corresponding heads in list 810 are in parenthesis.

At point 1010, the controller 310 writes data to zone 9 of disk surface 610*a* corresponding to head 210*a* (head 1). After writing to zone 9 of disk surface 610*a*, the controller 310 switches heads to head 210*c* (head 3) and writes data to zone 9 of disk surface 610*c*. After writing to zone 9 of disk surface 610*c*, the controller 310 switches heads to head 210*d* (head 4) and writes data to zone 9 of the disk surface 610*d*. After writing to zone 9 of disk surface 610*d*, the controller 310 switches heads to head 210*a* (head 1) and writes to zone 10 of the disk surface 610*a* at point 1012 of the access path 1005. The portion of the access path 1005 between points 1010 and 1012 correspond to the head-zone combinations in entries 820-835 of the ordered list 810. In this example, the controller 310 skips writing data to the disk surface 610*b* corresponding to head 210*b* (head 2) because the head-zone combinations associated with head 210*b* (head 2) are sorted farther down the list 810.

At point 1015, the controller 310 writes to zone 11 of the disk surface 610*a* corresponding to head 210*a* (head 1). After writing to zone 11 of disk surface 610*a*, the controller 310 switches heads to head 210*b* (head 2) and writes data to zone 1 of the disk surface 610*b* corresponding to head 210*b* (head 2). After writing to zone 1 of disk surface 610*b*, the controller 310 switches heads to head 210*c* (head 3) and writes data to zone 11 of the disk surface 610*c* corresponding to head 210*c* (head 3). After writing to zone 11 of disk surface 610*c*, the controller 310 switches heads to head 210*d* (head 4) and writes to zone 11 of the disk surface 610*d* corresponding to head 210*d* (head 4) at point 1020. The portion of the access path 1005 between points 1015 and 1020 correspond to head-zone combinations in entries 850-865 of the ordered list 810. In this example, the controller 310 begins writing data to disk surface 610*b* because the data rate for zone 1 of head 210*b* (head 2) is equivalent to the data rate for zone 11 of heads 210*a*, 210*c* and 210*d* (heads 1, 3 and 4).

In the example in FIG. 10A, the controller 310 writes data to the tracks of each zone from left to right, as indicated by the arrows in FIG. 10A. However, it is to be appreciated that the controller 310 may write to the tracks of each zone in any direction. For example, FIG. 10B shows an example of the access path 1005 where the controller 310 switches the direction in which data is written to the tracks between head switches, as indicated by the arrows in FIG. 10*b*. Head switches are indicated by dashed lines in FIGS. 10A and 10B. After each head switch to a particular head, the controller 310 may perform a track seek to position the head at a boundary of a desired zone of the respective disk surface and begin writing data to the desired zone. The controller 310 may position the head at an outer or inner boundary of the zone depending on the direction in which data is written to the tracks of the zone. For example, the head may be positioned at an outer boundary of the zone when data is written to the tracks of the zone from left to right. The controller 310 may also perform track seeks between tracks within a zone. Thus, the controller 310 may perform a sequence of head switches and track seeks of the head stack assembly 120 to write a sequence of data to the tracks of the disk surfaces 610*a*-610*d* along the access path 1005.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive comprising:
   one or more disks having a plurality of disk surfaces, wherein each disk surface comprises a plurality of data zones, each data zone having a data transfer rate;
   a plurality of heads, each head configured to write data to a respective one of the disk surfaces; and
   a controller configured to operate the plurality of heads to sequentially write a sequence of data blocks to the plurality of disk surfaces in accordance with an order of head-zone combinations ordered from highest data transfer rate to lowest data transfer rate, each head-zone combination corresponding to one of the heads and one of the data zones of the respective disk surface.

2. The disk drive of claim 1, wherein the controller is further configured to operate the plurality of heads to write the sequence of data blocks by sequentially progressing through the head-zone combinations in descending order, and for each head-zone combination, using the corresponding head to write a portion of the data blocks to the corresponding data zone.

3. The disk drive of claim 1, wherein the controller is further configured to operate the plurality of heads to write the sequence of data blocks by causing the heads to perform a sequence of head switches and track seeks to sequentially write the data blocks to tracks on the plurality of disk surfaces along an access path, wherein the access path is defined by sequentially progressing through the head-zone combinations in descending order.

4. The disk drive of claim 1, wherein the sequence of data blocks correspond to a sequence of logical block addresses.

5. The disk drive of claim 1, wherein each data zone comprises a plurality of concentric data tracks on the respective disk surface.

6. The disk drive of claim 5, wherein each data zone has a different number of sectors per track than the other zones of the respective disk surface.

7. The disk drive of claim 1, wherein the plurality of data zones of one of the disk surfaces has a different range of data transfer rates than the plurality of data zones of another one of the disk surfaces.

8. A method of operating a disk drive comprising a plurality of heads and a plurality of disk surfaces, wherein each disk surface comprising a plurality of data zones, each data zone having a data transfer rate, and wherein each head is configured to write data to a respective one of the disk surfaces, the method comprising:
   sequentially writing a sequence of data blocks to the plurality of disk surfaces in accordance with an order of head-zone combinations ordered from highest data transfer rate to lowest data transfer rate, each head-zone combination corresponding to one of the heads and one of the data zones of the respective disk surface.

9. The method of claim 8, wherein the sequentially writing the sequence of data blocks comprises:
   sequentially progressing through the head-zone combinations in descending order; and
   for each head-zone combination, writing a portion of the data blocks to the corresponding data zone using the corresponding head.

10. The method of claim 8, wherein the sequentially writing the sequence of data blocks comprises:
    performing a sequence of head switches and track seeks of the heads to sequentially write the data blocks to tracks on the plurality of disk surfaces along an access path, wherein the access path is defined by sequentially progressing through the head-zone combinations in descending order.

11. The method of claim 8, wherein the sequence of data blocks correspond to a sequence of logical block addresses.

12. The method of claim 8, wherein each data zone comprises a plurality of concentric data tracks on the respective disk surface.

13. The method of claim 12, wherein each data zone has a different number of sectors per track than the other zones of the respective disk surface.

14. The method of claim 8, wherein the plurality of data zones of one of the disk surfaces has a different range of data transfer rates than the plurality of data zones of another one of the disk surfaces.

15. A method for formatting a disk drive comprising a plurality of heads and a plurality of disk surfaces, wherein each disk surface comprises a plurality of data zones, each data zone having a data transfer rate, and wherein each head is configured to write data to a respective one of the disk surfaces, the method comprising:
    determining the data transfer rate of each of a plurality of head-zone combinations, each head-zone combination corresponding to one of the heads and one of the data zones of the respective disk surface;
    ordering the head-zone combinations from highest data transfer rate to lowest data transfer rate; and
    storing data related to the ordering in the disk drive.

16. The method of claim 15, wherein each data zone comprises a plurality of concentric data tracks on the respective disk surface.

17. The method of claim 16, wherein each data zone has a different number of sectors per track than the other zones of the respective disk surface.

18. The method of claim 15, wherein the plurality of data zones of one of the disk surfaces has a different range of data transfer rates than the plurality of data zones of another one of the disk surfaces.

19. A disk drive comprising:
    one or more disks having a plurality of disk surfaces, wherein each disk surface comprises a plurality of data zones, each data zone having a data transfer rate;
    a plurality of heads, each head configured to write data to a respective one of the disk surfaces; and
    a controller configured to operate the plurality of heads to access data on the plurality of disk surfaces according to a logical addressing that maps logical addresses according to an order of head-zone combinations ordered from highest data transfer rate to lowest data transfer rate, each head-zone combination corresponding to one of the heads and one of the data zones of the respective disk surface.

20. The disk drive of claim 19, wherein the logical addressing corresponds to a sequence of logical block addresses.

21. The disk drive of claim 19, wherein the logical addressing sequentially progresses through the head-zone combinations in descending order.

22. The disk drive of claim 19, wherein the controller is further configured to operate the plurality of heads to follow the logical addressing by causing the heads to perform a sequence of head switches and track seeks to write data blocks to tracks on the plurality of disk surfaces along an access path, wherein the access path is defined by sequentially progressing through the head-zone combinations in descending order.

* * * * *